United States Patent [19]

Hurst et al.

[11] Patent Number: 5,276,905
[45] Date of Patent: Jan. 4, 1994

[54] MOBILE RADIO TRANSMISSION SYSTEM USING PREFERRED HOME SERVICE AREA

[75] Inventors: Allan F. Hurst; David J. Harrison; John D. Wittams, all of Cambridge, England

[73] Assignee: U.S. Philips Corporation, New York, N.Y.

[21] Appl. No.: 478,116

[22] Filed: Feb. 7, 1990

[30] Foreign Application Priority Data

Feb. 8, 1989 [GB] United Kingdom ............... 8902743

[51] Int. Cl.$^5$ .................. H04Q 7/02; H04Q 9/02; H04B 17/02
[52] U.S. Cl. ................. 455/33.1; 455/54.2; 455/62; 379/60
[58] Field of Search .......... 455/33, 34, 52, 53, 455/54, 56, 62, 33.1, 33.2, 33.3, 34.1, 34.2, 52.1, 53.1, 54.1, 54.2, 56.1, 62; 379/58, 59, 60, 63

[56] References Cited

U.S. PATENT DOCUMENTS

| | | | |
|---|---|---|---|
| 3,898,390 | 8/1975 | Wells | 455/34 |
| 4,392,242 | 7/1983 | Kai | 455/62 |
| 4,670,905 | 6/1987 | Sandvos et al. | 455/56 |
| 4,833,701 | 5/1989 | Comroe et al. | 455/33 |
| 4,850,033 | 7/1989 | Eizenhofen et al. | 455/33 |
| 4,876,738 | 10/1989 | Selby | 455/33 |
| 4,903,320 | 2/1990 | Hanawa | 455/54 |
| 4,905,301 | 2/1990 | Krolopp et al. | 455/34 |
| 4,916,728 | 4/1990 | Blair | 455/33 |

FOREIGN PATENT DOCUMENTS

| | | |
|---|---|---|
| 0126557 | 11/1984 | European Pat. Off. . |
| 0283955 | 9/1988 | European Pat. Off. . |
| 2069799 | 8/1981 | United Kingdom . |

OTHER PUBLICATIONS

"UK Trunking System Signalling Standard-Protocol Aspects", Journal of the Institute of Electronic and Radio Engineers, vol. 67, No. 3, pp. 119-124 May/Jun. 1987.

Primary Examiner—Reinhard J. Eisenzopf
Assistant Examiner—Lisa Charouel
Attorney, Agent, or Firm—David R. Treacy

[57] ABSTRACT

A private mobile radio transmission system comprising a plurality of geographically spaced base stations (BS) defining a plurality of overlapping service areas (SA). The base stations are coupled for example by land-line communication links (CL) to a system controller (SC). Mobile stations (MS) equipped with simplex two-way radios are free to roam through the service areas. In order to be able to make a call with or via a base station it is necessary for the mobile station to be registered with the base station concerned. Details of the registration are stored by the mobile station concerned and the base station. In order to optimise on the usage of radio channels, details of a home base station are preprogrammed into each mobile station and when the mobile station wishes to register with a base station, it is instructed to try to register firstly with its own base station, on the basis that the majority of calls will be to and from the home service area and will require only one pair of frequencies, secondly with a base station of any other service area in its region, and thirdly with a base station of a service area in any other region. When registered with a service area other than its home one, the mobile station checks regularly to see if it is possible to register with its home service area.

17 Claims, 2 Drawing Sheets

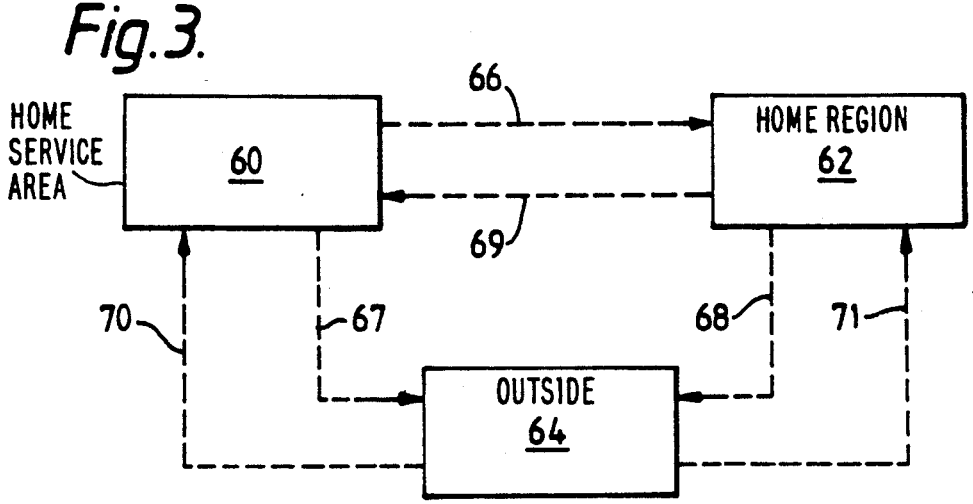
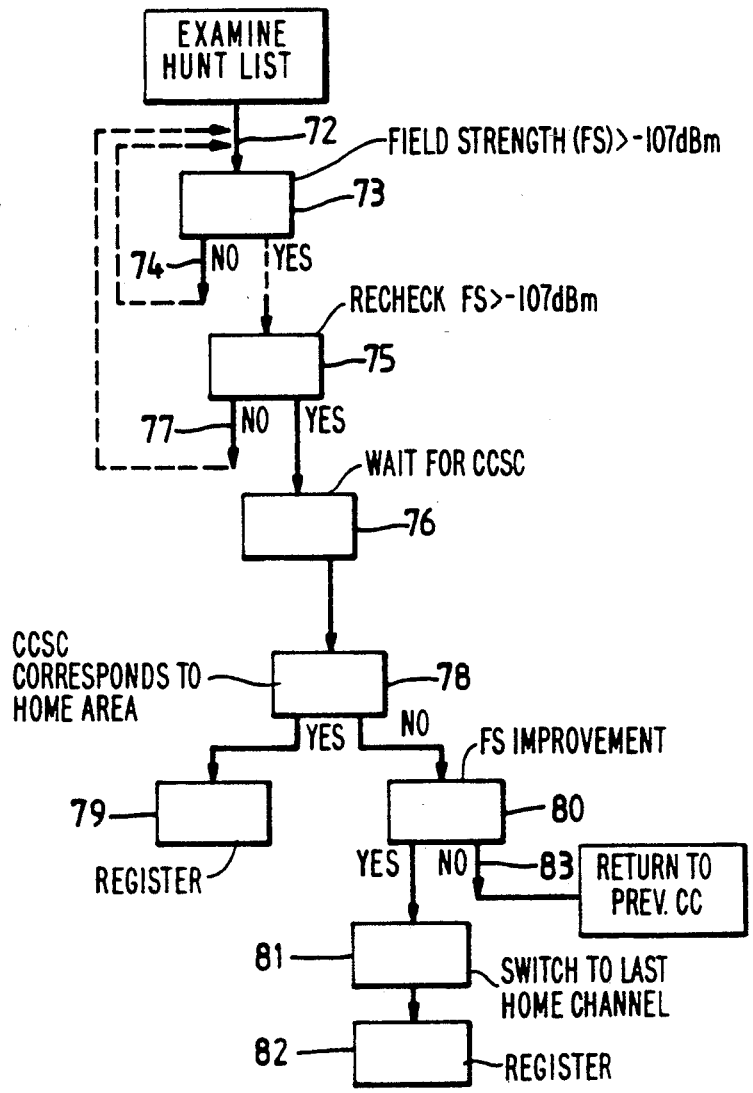

MOBILE RADIO TRANSMISSION SYSTEM USING PREFERRED HOME SERVICE AREA

BACKGROUND OF THE INVENTION

The present invention relates to a mobile radio transmission system and to a mobile station for use in the system.

Such a system typically comprises a plurality of base stations situated at respective geographical locations to define a plurality of service areas within an overall region and a plurality of mobile stations capable of communicating by two-way radio with each base station when in communication range of that base station. Each base station comprises the entirety of transmitters and receivers operated by a trunking system controller (TSC) at any one site or service area. The communication link established is two-frequency simplex, that is one frequency is allocated to forward transmission from a base station to a mobile station and a second frequency is allocated for return transmission from a mobile station to a base station. Blocks of radio channels chosen from an overall band of channels are allocated to each base station. In the case of trunked radio, the base stations of a region may be connected by way of land line to a control station (CS) or may be connected as a mesh with the base stations interconnected with each other. There may be two or more regions in which case each region has its own CS which controls a plurality of associated base stations. The CSs are connected together by land lines.

In a known such system each mobile station is arranged when operative to register with a base station of which it is within communication range and thereby with the corresponding service area, and to respond to it being no longer within communication range of a base station serving a service area with which it is currently registered by registering with another base station of which it is within such range (if any) and thereby with the corresponding service area. The base station responds to the registration request by storing the identity of the service area corresponding to the relevant base station in that one of its location records which corresponds to the registering mobile station. The registration procedure is carried out so that if it is desired to call a particular mobile station it is known in which service area that mobile station is currently located; the CS arranges that the call is directed to the or each base station which serves the relevant service area, which base station in turn calls the relevant mobile station. An advantage of a registration procedure is that if there was no provision for registration then all the base stations of the system would have to call the particular mobile station, which would impose a considerable overhead on the transmission capacity of the system. However, a disadvantage with this known registration procedure is that if a mobile station is roaming near a border between two or more service areas so that it frequently moves between areas it will frequently change its registration from one service area to another, again imposing a considerable overhead on the communication channel capacity of the system.

European Patent Specification EP-A2-0260763 discloses a multiple registration method aimed at reducing the transmission overhead associated with the above described system. This multiple registration method enables the TSC to store a list of up to n registrations for each mobile. The mobiles each have storage facilities for storing the same list of registrations as are stored by the TSC in respect of itself. As a mobile enters a new service area it automatically registers with the area's base station thus updating the list of registration stored by the mobile and its associated TSC. By storing these registrations an enlarged service area is created. If a TSC wishes to contact a mobile it refers to the list of registrations which it is storing for that mobile and initially transmits a signal to the base stations which are registered, either successively, beginning with say the most recent registration, or simultaneously. If this is not successful then the TSC tries the other base stations. Provision is made for reordering the list on the basis that the channel number and frequencies of the service area in which a mobile last made a call are at the top of the list. In the event of the list of registrations not being updated and/or a call not being made to or received from a mobile after a set period then it is possible for registrations to be cancelled one at a time thereby reducing the size of the enlarged service area. While it is possible for all the registrations to be cancelled, it is preferred that at least one registration of a service area remain to prevent a flood of registrations at the start of a working day. If, at the start of a working day, a mobile is not registered in the service area in which it is currently located it has to arrange to immediately register. This method is quite workable but does have a drawback in that it will not necessarily optimise the usage of radio channels.

This drawback will be better understood by considering a hypothetical case of a circular geographical region of about 128 km with 7 base stations serving it. Obviously hilly areas tend to mask some mobiles from some base stations, and the signal strength obtained by a mobile from a base station varies inversely with the distance to the base station. The propagation map allows a generous margin of signal strength so that most mobiles can "see" most base stations.

The frequencies currently used in Great Britain for trunked private mobile radio systems are around 200 MHz, which are very penetrating and give good coverage, especially since the mobiles are extremely sensitive.

The power and number of radio channels fitted per base station are carefully chosen to correspond to the expected activity local to that base station.

The radio protocol used, for example a subset of MPT 1327-A Signalling Standard for Trunked Private Land Mobile Radio Systems issued by the Department of Trade and Industry, London 1988, effectively requires the mobiles to hold on to a registration as long as they can. The intention is, of course, to reduce the overhead of registration signalling on the network, which supplies no calls to the user.

Furthermore, the MPT 1327 protocol has a good error-correction layer, and so a significant number of on-air bits can be lost before any particular signalling packet fails. In consequence a mobile will not attempt to re-register on another base station unless the packet-level error rate on his present one is high. However on the fringe of the coverage area this can lead to a poor grade of service both in terms of speech signal-to-noise and in call set-up failure rate.

The result of the above set of circumstances is to change the radio topology of the network from being a number of largely isolated cells with little overlap, resulting in the registration map largely corresponding to the geographical position of the mobile, to one in which the cells very greatly overlap, causing the registration map to be largely random. Each base station has a number of mobiles registered on it proportional to its radio coverage, and these mobiles are distributed over the part of the region in which this can be "seen". Each mobile has only a small chance of being registered on the base station where it is most likely for its calls to be satisfied by that base station alone, which base station may be regarded as the mobile's home site or home service area.

The effect of this is that a high percentage of calls say 80% are intersite calls, using 2 radio traffic channels per call instead of one, the system capacity is almost halved, and the number of calls each base station must support bears little relation to the carefully estimated local population on which its size and power were based. This means that a base station gets a load proportional to the size of its radio coverage, not the number of channels fitted. This has the potential of grossly overloading the smaller service areas. Creating more service areas within the region by adding more base stations actually makes things worse, since it means that each mobile's chance of being registered on its home site is proportionally reduced.

SUMMARY OF THE INVENTION

An object of the present invention is to optimise the usage of radio channels in a mobile radio transmission system.

According to one aspect of the present invention a radio transmission system comprises a plurality of base stations situated at respective geographical locations to define a corresponding plurality of overlapping service areas constituting one or more regions, and mobile stations capable of communicating by two-way radio with any one of the base stations. Each mobile station comprises a transmitter, a receiver, and control means for controlling the mobile station, and each mobile station is pre-programmed with details identifying a predetermined service area which is defined as its home service area. The control means is programmed to register the mobile station with its home service area in preference to any other service area provided that the signal quality between the home base station and the mobile station is acceptable.

The present invention is based on the realisation that most calls will be made between a mobile station and a despatcher who is fixed relative to the home base station or between two mobile stations who are registered with the home base station. Thus if a mobile station stays registered with the home base station for as long as possible and is instructed to return to the home base station whenever possible, then the likelihood of mobiles which are still within communication range of the home base station, even though they are out of its defined service area, being involved in mobile to mobile calls by way of two base stations and requiring 2 traffic channels is reduced. Thus one traffic channel is saved together with the overhead of signaling between base stations.

If desired, the control means of each mobile station may be programmed to hunt through the other service areas in its home region and attempt to register with one of them in the event of the mobile station not being able to register with its home service area.

In the event of a mobile being unable to register in its home region, the control means of a mobile station may be programmed to hunt through the service areas in other regions and attempt to register with one of them in the event of the mobile station not being able to register with a service area in its home region.

The control means may be programmed to check the list of channels in its storage means and if it is not using the control channel assigned to its home service area, it checks to see if the home control channel can be received with adequate signal quality and if so the mobile station attempts to register with its home service area.

If desired, each base station may be instructed to transmit the number of its current control channel and control channels of other service areas and at the mobile station the control means may be programmed to check that the system identity codes received corresponds to the channel numbers stored for those service areas and if not it updates the numbers stored. Such a measure if implemented reduces the acquisition time and makes more accurate the mobile station's method of acquiring, if possible, its home site.

Each mobile station may store a parameter indicative of the signal quality of the respective control channels in the system, and in consequence the control means of a mobile station unable to register with its home service area may be programmed to take into account the signal quality as indicated by the parameter when seeking to register with another service area.

According to another aspect of the present invention a mobile station, for use with the radio transmission system in accordance with the first aspect of the present invention, comprises a transmitter, a receiver, control means for controlling the operation of the mobile station and means for assessing the quality of a received signal. The control means is pre-programmed with details identifying a predetermined service area which is defined as its home service area, and is programmed to register the mobile station with its home service area in preference to any other service area provided that the signal quality between the home base station and the mobile station is acceptable.

The present invention will be described, by way of example, with reference to the accompanying drawings.

BRIEF DESCRIPTION OF THE DRAWING

FIG. 3 is a flow chart of a registration procedure, and FIG. 4 is a flow chart of an algorithm for implementing the channel hunting operation.

DESCRIPTION OF THE PREFERRED EMBODIMENT

Figure 1:
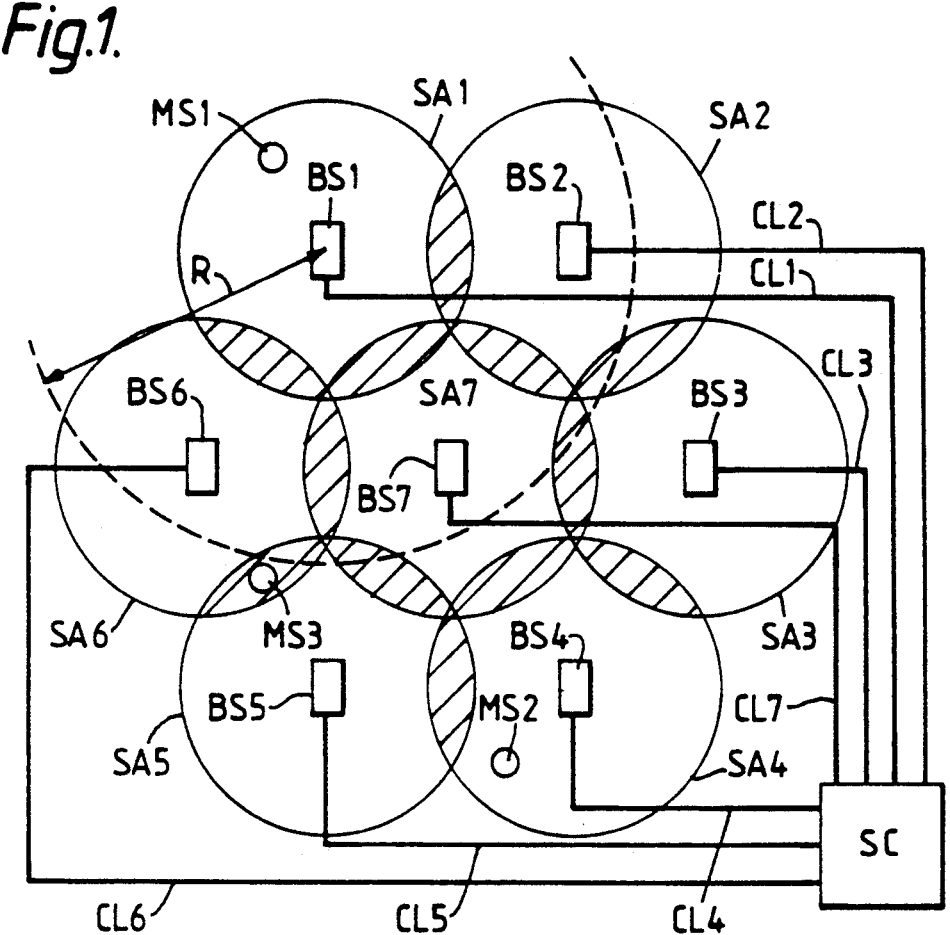
FIG. 1 illustrates diagrammatically the geographical layout of a hypothetical radio transmission system.

In the drawings the same reference numerals have been used to indicate corresponding features.

Referring to FIG. 1 the system comprises a plurality of base stations BS of which seven, BS1 to BS7, are shown, situated at respective geographical locations. Each of these base stations comprises an entirety of radio transmitters and receivers operated by a trunking system controller. The respective service areas SA1 to SA7 of these base stations overlap, as shown by the cross-hatching, to collectively cover the whole region shown. A plurality of mobile stations MS are provided of which three, MS1, MS2 and MS3 are shown. Each mobile station is free to roam throughout the whole region, and indeed outside it. Each of these mobile stations also comprises a radio transmitter/receiver which is capable of communicating with a base station transmitter/receiver when it is within satisfactory communication range of that base station transmitter/receiver, and also comprises means for controlling various operations. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to the public switched telephone network (PSTN) to enable communication to take place between a mobile station MS1 and a subscriber to that network, if desired. Alternatively the base stations BS1 to BS7 may be interconnected by a mesh network.

For convenience it will be assumed that the system operates in accordance with a signalling protocol as described in a paper by P. J. Mabey, D. M. Ball and D. J. Harrison entitled "UK Trunking System Signalling Standard—Protocol Aspects" in the Journal of the IERE, May/June 1987, pages 119-124, although this is not necessarily the case. In accordance with this protocol the base stations BS each transmit on a substantially continuous basis a succession of data codewords on a "forward" (radio) control channel, these codewords normally being so-called control channel system codewords (CCSC) and other codewords, transmitted alternately. In the system of the present example a bit field of each control channel system codeword transmitted by each base station BS constitutes an identifier AREA of the particular service area SA served by the relevant base station. Thus, if a mobile station MS tunes its radio receiver to the control channel corresponding to a base station BS with which it is within communications range it will receive repeatedly a code indicative of the particular service area SA served by that base station. The "other" codewords, which each contain an address field, may constitute messages addressed to all, particular ones, or groups of the mobile stations MS, each such mobile station being assigned a unique address which is stored therein for reference. Moreover, many of the codewords transmitted by each base station constitute an invitation to all, particular ones, or groups of mobile stations within communication range to transmit to the base station a message codeword on a "return" control channel within a randomly chosen one of a number of immediately succeeding time slots, which number is contained in a further bit field of the invitation codeword. This number may be determined dynamically in accordance with a method described, for example, in GB-B-2 069 799. The message codeword transmitted by a given mobile station MS contains the unique address of that station and may constitute, for example, a request for service. The signalling on the forward and return control channels may be employed, for example, to set-up a communications channel between a pair of mobile stations via the base station(s) with which they are within communications range. The signalling on the forward channel is under the control of the system controller SC.

In accordance with the present invention, each mobile station MS is assigned a base station BS. The assignment of a mobile station to a base station is done on the basis that it is anticipated that the majority of the calls to and from the mobile station will originate from within that service area. Accordingly the base station will be treated as the home base station and details of the control channel for that service area will be programmed into non-volatile storage means in the mobile station and in an appropriate storage location of the system controller SC. Once this has been done then the mobile station is said to be registered. In the illustrated example the mobile stations MS1, MS2 and MS3 will be assumed to be registered with "home" base stations BS1, BS4 and BS6, respectively. Details of the control channels of all the service areas in the region are stored in the system controller SC together with the corresponding details of service areas in other regions.

Considering mobile station MS1 as an example, when it roams around its home service area SA1, calls to and from other mobiles also registered with the base station BS1 as their home base station make use of one channel pair of frequencies because the communications link is a simplex one. However a call which is set-up between say mobile stations MS1 and MS2 requires the allocation of one traffic channel pair of frequencies for communication between mobile station MS1 and base station BS1 and a second traffic channel pair of frequencies for communication between mobile station MS2 and base station BS4.

When the mobile station MS1 roams out of its service area SA1 in which it is registered, instead of automatically registering with the service area it has entered, it maintains communication with its home base station until for example the packet-level error rate on its present channel pair is unacceptably high or some other measure of signal quality becomes unacceptable. Thus for example it is able to roam over an enlarged service area of radius R without having to register with another service area.

Once the signal quality becomes unacceptable, for example because the packet-level error rate is unacceptably high, then it is necessary for the mobile station to register with another service area. In order to reduce the hunt for another service area, the mobile station also has in its non-volatile memory an ordered list of frequencies and their associated service area identities. The first entry is the home base station and this is followed by all the other service areas in the home region, followed by those service areas in other regions which have been acquired in the mobile station's travels. The mobile station also knows the frequency and service area identity of the control channel which it is at present using. All the information in this list, apart from the identity of the home base station is acquired dynamically from the network.

Figure 2:
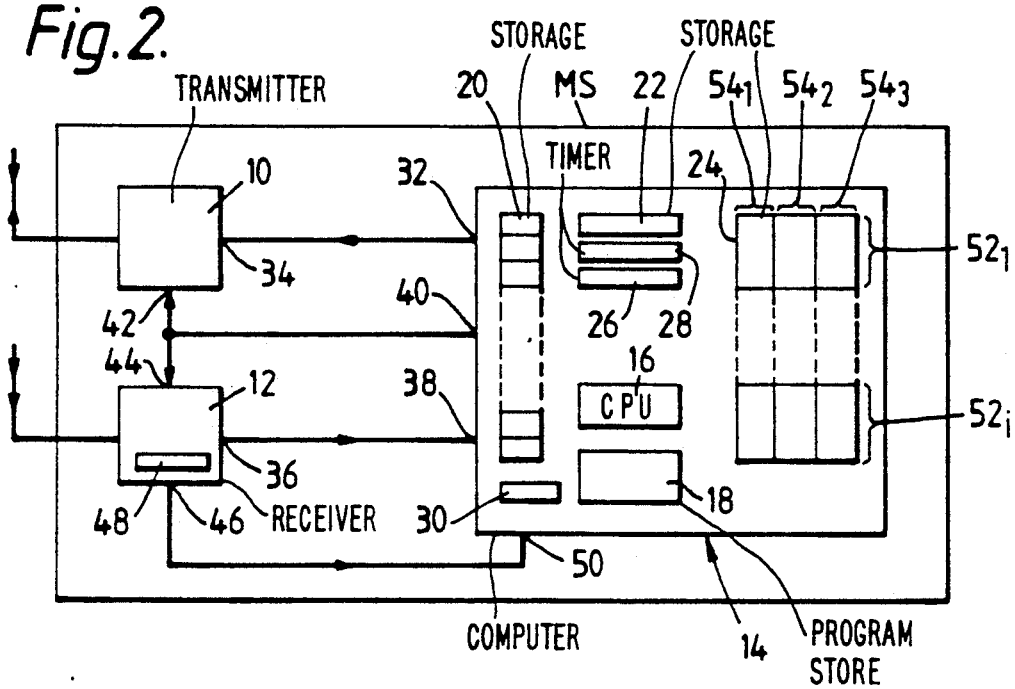
FIG. 2 is a block schematic diagram of an embodiment of a mobile station.

Referring to FIG. 2, the mobile station MS comprises a transmitter portion 10, a receiver portion 12 and a digital computer system 14. The computer system 14 includes, in addition to the conventional processing unit(s) 16 and program store 18, data storage means 20, 22 and 24, timers 26 and 28 and a real-time clock 30. A serial data output port 32 of the computer system 14 is connected to a modulation signal input 34 of the transmitter portion 10 and a demodulated signal output 36 of the receiver portion 12 is connected to a serial data input 30 of the computer system 14. A parallel data output port 40 of the computer system 14 is connected to tuning control inputs 42 and 44 of the transmitter and receiver portions 10 and 12 respectively. The output 46 of a received signal-level threshold detector 48 included in the receiver portion 12 is connected to a further signal input 50 of the system 14.

Storage means 20 stores a list of all the radio channels employed in the communications system, each "forward" channel being stored in conjunction with the corresponding "return" channel. Storage means 22 stores the address of the relevant mobile station MS. Storage means 24 constitutes a location record, service area identities being stored in the respective fields $52_1$ to $52_i$. Fields $54_1$, $54_2$ and $54_3$ of each field 52 store the actual service area identity, a control channel number and a time respectively.

The computer system 14 is programmed to decode the digital words applied by receiver portion 12 to its input 38 and suitably react if appropriate, and also to format digital words and apply them to its output 32 for transmission by the transmitter portion 10 when appropriate. (The manner in which this decoding and formatting is carried out is conventional, and will not be elaborated upon here as it is irrelevant to the present invention.) It is also programmed to apply to its parallel output 40 a digital word for tuning the transmitter and receiver portions to the return and forward channel frequencies respectively corresponding to any of the channels stored in store 20.

As mentioned above the base station of each service area broadcasts on a regular basis on its control channel all the service area identities of its region with their associated control channel frequencies, plus those of at least some of the adjacent regions. Since each of these messages contains only one service area and control channel number, many such messages will have to be sent, though the repetition rate can be low, perhaps by cycling through a list of ten or twenty messages over a period of a half hour. Any mobile station on reception of one of these messages will use it to update the appropriate entry in its list of site identities and control channel frequencies.

Whenever a mobile station is not engaged in a call it will periodically, perhaps every 3 minutes, check its list. If its present control channel is not the one belonging to the mobile station's home service area, it will check to see if it can receive its home service area's control channel, and if it can and the signal quality is satisfactory, then it will attempt to register on it. If the mobile station is currently on its home service area's control and the signal is satisfactory, it will take no action.

Whenever a roaming mobile station is at present registered with a service area outside its home region, it will attempt to register within its home region even if it cannot receive signals from its home service area. It may do this by selecting the list of control channels associated with the service areas forming the home region and cycle through this list in an attempt to find a usable control channel amongst them.

In order to reduce the risk of missing an incoming call a mobile station may optionally wait for a withdrawn slot in the present control channel's signalling stream to look at the home service area. The network may optionally use the "vote now" message to withdraw slots for this purpose.

If the present control channel being used by a mobile station is unsatisfactory (poor error rate, low signal level) the mobile station will attempt to register on another control channel in the order of preference given in its list. The mobile station may have as a parameter in the list a measure of the quality of the control channels and may use this measure in order to bias registration attempts towards a good quality signal.

The order of preference for registration is:
firstly—the home service area so long as the signal quality is adequate, secondly—any service area in the home region, optionally the service area with the best signal, and thirdly—any other service area, optionally the service area with the best signal.

This is summarised by FIG. 3 in which the blocks 60, 62 and 64 respectively represent the operations registered on the home service area, registered in home region and registered outside the home region. The arrow 66 represents the state of the home service area signal being unusable and a mobile station trying to register with another service area in the home region. The arrows 67, 68 both represent the situation of the mobile station not being able to register in any home region service area and trying to register with a service area outside the home region.

The arrows 69 and 70 represent the mobile station checking to see if the home service area is usable, this checking taking place at regular intervals, say every 3 minutes, or when the present control channel becomes unusuable. Finally the arrow 71 represents the situation when the mobile station has found that the home service area is unusuable but is checking to see if another service area in the home region is available. Such checking is carried out at regular intervals, say every 3 minutes or when the present control channel becomes unusable.

An algorithm relating to an implementation of at least some of the operations described with reference to FIG. 3, will now be described with reference to FIG. 4. FIG. 4 assumes that the system is using the MPT 1327 protocol mentioned in the preamble of this specification.

This algorithm can be summarised by saying that if the home service area is available and is acceptable for use when the mobile station uses it in preference to others. When the home service area is not available, then additional criteria to be added to the mobile station's reasons for leaving a control channel so that within certain limits, the service area with the strongest base station may be acquired.

The channel number relating to the home service area will be stored in the mobile station's non-volatile memory whenever it registers on a channel where the control channel system codeword (CCSC) corresponds to its home service area data.

A field, relating to the home data within the CCSC is stored as a customisable parameter within the mobile station's read only memory. The control channel relinquishing criteria will be split into that required for the home service area and that for any other service area. With respect to the home service area these criteria will be as currently employed, for example bad signalling or excessive error rate.

The algorithm in FIG. 4 assumes that the mobile station is registered on a service area other than the home service area, the mobile station, following every 20 seconds of operator inactivity and no involvement in signalling, will momentarily switch to one channel (channel "n") within its normal hunt list and examine that channel as a possible new control channel, operation 72.

The field strength is monitored, operation 73, and if the field strength is less than $-107$ dBm the mobile station will reject the channel, operation 74, and return to the control channel it first left. In this case, following another 20 sec. period, the mobile station will then try the next channel in the normal hunt list (channel $n+1$).

If as a result of the monitoring operation 73 the field strength is greater than $-107$ dBm, then the mobile station will flag this event and return to its control channel. When the next 20 second interval has elapsed, the mobile station will return to this channel (channel n) and re-check the field strength, operation 75. If the field strength is still greater than $-107$ dBm, this it will wait for a CCSC (between 150 and 450 msec) and check its data, operation 76. However if the field strength is now less than $-107$ dBm, the mobile station will return to its control channel, operation 77, and subsequently after 20 seconds attempt the next channel (channel n+1) in the normal hunt list.

If the data contained within the CCSC corresponds to the home service area, operation 78, then the mobile station will accept it as its new candidate control channel and attempt to become available on it by way of the normal error checking and registration procedures, operation 79.

If the data within the CCSC does not correspond to the home service area, then the mobile station will compare the relative R.F. signal strength of this channel and that previously recorded for its control channel, operation 80. If the improvement is greater than 12 dBm the mobile station will prior to accepting this channel as a candidate control channel, momentarily switch to the last recorded home service area channel, operation 81, and wait for a CCSC or timeout. If the home service area is available then the mobile station will abandon the alternative candidate control channel and will attempt to acquire the home service area, otherwise, the mobile station will continue to accept the candidate channel as its new control channel and will attempt to become available on it by way of the normal error checking and registration procedures, operation 82.

Lastly if as a result of the comparison in operation 80, the signal is less than 12 dB up on the original channel then it will return to its previously recorded control channel, operation 83.

By adopting the concept of each mobile station being pre-programmed with details of the home service area and instructing a roaming mobile station that it should always try to register with its home service area and, if this is not possible, to try and register with a service area in its home region and failing that with a service area in a region outside its home region, it is considered that many more calls will be single service area calls requiring only one channel traffic pair of frequencies. The fact that there is overlap of coverage of service areas is a positive advantage because each service area covers a greater part of a region and so can satisfy a bigger proportion of home service area calls by itself, this is less likely to be the case in a topology with small coverage of each site. A reduction in calls involving two service areas and two traffic channel pairs of frequencies means that the effective capacity of the system can be greater. Finally overlap of service areas reduces the chance of black spots occurring at which communication between a mobile station and a base station is not possible.

From reading the present disclosure, other modifications will be apparent to persons skilled in the art. Such modifications may involve other features which are already known in the design, manufacture and use of mobile radio transmission and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A radio transmission system comprising a plurality of base stations situated at respective geographic locations to define a corresponding plurality of overlapping service areas constituting one or more regions, and a plurality of mobile stations, each mobile station comprising a respective transmitter and receiver, and respective control means for controlling said mobile station, characterized in that each said control means comprises means for pre-programming details to identify a predetermined one of said service areas as its home service area, and the one of said base stations defining said one of said service areas being its home base station, and means, responsive to signal quality between a given mobile station and its home base station being acceptable, for registering said given mobile station with said its home service area in preference to any other one of said service areas.

2. A system as claimed in claim 1, wherein each respective base station has assigned thereto a respective control channel having a respective number, characterized in that each said base station is instructed to transmit system identity codes including the number of its current control channel and the control channels of the other service areas, and each said control means comprises storage means for storing a plurality of control channel numbers, and is programmed to check that the system identity codes received correspond to the control channel numbers stored for those service areas and, responsive to non-correspondence, to update the control channel numbers stored.

3. A system as claimed in claim 2, characterised in that each said mobile station stores a parameter indicative of the signal quality of the respective control channels in the system, and wherein the control means of a mobile station unable to register with said its home service area is programmed to take into account the signal quality as indicated by the parameter when seeking to register with another service area.

4. A radio transmission system comprising a plurality of base stations situated at respective geographic locations to define a corresponding plurality of overlapping service areas constituting one or more regions, and a plurality of mobile stations, each mobile station comprising a respective transmitter and receiver, and respective control means for controlling said mobile station, characterized in that each said control means comprises means for pre-programming details to identify a predetermined one of said service areas as its home service area, the one of said base stations defining said one of said service areas being its home base station, and the region within which said one of said base stations is situated being its home region, means, responsive to signal quality between a given mobile station and said its home base station being acceptable, for registering said given mobile station with said its home service area in preference to any other one of said service areas, and means, responsive to said mobile station being unable to register with said its home service area, for hunting through the other service areas in said its home region and attempting to register with one of them.

5. A system as claimed in claim 4, wherein each respective base station has assigned thereto a respective control channel having a respective number, characterized in that each said base station is instructed to transmit system identity codes including the number of its current control channel and the control channels of the other service areas, and each said control means comprises storage means for storing a plurality of control channel numbers, and is programmed to check that the system identity codes received correspond to the control channel numbers stored for those service areas and, responsive to non-correspondence, to update the control channel numbers stored.

6. A system as claimed in claim 4, characterized in that the control means of each mobile station is programmed to hunt through the service areas in the other regions and attempt to register with one of them if the mobile station is not able to register with one of the service areas in its home region.

7. A system as claimed in claim 6, wherein each respective base station has assigned thereto a respective control channel having a respective control channel number, characterized in that each said control means comprises storage means for storing a plurality of said control channel numbers.

8. A system as claimed in claim 7, characterised in that each control means is programmed to check a list of channels in its storage means, and, if it is not using the control channel assigned to said its home service area, to check if that control channel can be received with adequate signal quality; and if so, the mobile station attempts to register with said its home service area.

9. A system as claimed in claim 7, characterized in that each said base station is instructed to transmit system identity codes including the number of its current control channel and the control channels of the other service areas, and each said control means is programmed to check that the system identity codes received correspond to the control channel numbers stored for those service areas and, responsive to non-correspondence, to update the control channel numbers stored.

10. A system as claimed in claim 9, characterized in that each said mobile station stores at least one parameter indicative of the signal quality of a corresponding one of the control channels in the system; and wherein the control means of said mobile station is programmed to take into account the signal quality as indicated by said at least one parameter when seeking to register with another service area, if said mobile station is unable to register with said its home service area.

11. A mobile station for use in a radio transmission system having a plurality of base stations defining a plurality of respective overlapping service areas constituting one or more regions, each mobile station comprising a respective transmitter and receiver, respective control means for controlling said mobile station, and respective means for assessing the quality of a received signal, characterized in that each said control means is preprogrammed with details identifying a predetermined one of said service areas as its home service area, the one of said base stations defining said one of said service areas being its home base station, and the region within which said one of said base stations is situated being its home region, and each said control means is programmed to register the mobile station with said its home service area in preference to any other one of said service areas, responsive to said quality between said mobile station and said its home base station being acceptable.

12. A mobile station as claimed in claim 11, characterised in that the control means is programmed to hunt through the other service areas in said its home region and attempt to register with one of them if the mobile station is not able to register with said it home service area.

13. A mobile station as claimed in claim 12, characterised in that the control means is programmed to hunt through the service areas in other regions and attempt to register with one of them if the mobile station is not able to register with any of said service areas in said its home region.

14. A mobile station as claimed in claim 13, for use in said system, wherein each said base station has assigned thereto a respective control channel having a respective number, characterized in that said control means comprises storage means for storing a plurality of the control channel numbers.

15. A mobile station as claimed in claim 14, characterised in that the signal quality assessing means stores a parameter indicative of the signal quality of the respective control channels in the system, and in that said control means is programmed to take into account the signal quality as indicated by said parameter when seeking to register with another service area.

16. A mobile station as claimed in claim 14, characterized in that each said control means is programmed to check a list of channels in its storage means and, if it is not using the control channel assigned to said its home service area, to check if the home service area control channel can be received with adequate quality signal; and if so, the mobile station attempts to register with said its home service area.

17. A mobile station as claimed in claim 16, for use in said systems wherein each said base station is instructed to transmit system identity codes including the number of its current control channel and the control channels of the other service areas, characterizd in that each said control means is programmed to check that the system identity codes received correspond to the control channel numbers stored for those service areas and, responsive to non-correspondence, to update the control channel numbers stored.

* * * * *